United States Patent [19]

Huntington

[11] Patent Number: 4,559,822
[45] Date of Patent: Dec. 24, 1985

[54] AIRCRAFT POTENTIAL OF WING LIFT INSTRUMENT AND METHOD

[76] Inventor: Morgan G. Huntington, P.O. Box 135, Galesville, Md. 20765

[21] Appl. No.: 371,450

[22] Filed: Apr. 23, 1982

[51] Int. Cl.$^4$ ............................................. G01N 21/00
[52] U.S. Cl. ................................. 73/178 R; 244/1 R
[58] Field of Search ................ 73/178 T, 180, 178 R; 244/1 R, 203, 187

[56] References Cited

U.S. PATENT DOCUMENTS

| | | | |
|---|---|---|---|
| 2,352,955 | 7/1944 | Johnson | 73/180 |
| 2,431,241 | 11/1947 | Godsey, Jr. | 73/178 R X |
| 2,538,303 | 1/1951 | Findley | 73/178 R |
| 2,590,521 | 3/1952 | Dyche, Jr. | 73/180 |
| 2,635,152 | 4/1953 | Dyche, Jr. | 73/178 R X |
| 3,327,529 | 6/1967 | Bowles et al. | 73/180 |
| 3,470,740 | 10/1969 | De Leo | 73/178 R |
| 3,686,936 | 8/1972 | Daudt, Jr. | 73/178 R X |
| 3,714,825 | 2/1973 | Melvin | 73/178 T |
| 4,154,190 | 5/1979 | Utgoff | 73/178 T |
| 4,435,695 | 3/1984 | Maris | 73/178 R |

FOREIGN PATENT DOCUMENTS

| | | | |
|---|---|---|---|
| 702289 | 1/1954 | United Kingdom | 244/1 R |
| 2085821 | 5/1982 | United Kingdom | 244/1 R |
| 366121 | 7/1973 | U.S.S.R. | 73/178 R |

Primary Examiner—Stephen A. Kreitman
Assistant Examiner—Tom Noland
Attorney, Agent, or Firm—Bernard, Rothwell & Brown

[57] ABSTRACT

An instrument and method for continuously measuring by differential air pressure the surplus of kinetic energy of an aircraft mass and the resulting potential of wing lift (POWL) above an empirical datum which coincides with the incremental onset of mushing sink, and for coincidentally and continuously displaying the margin of measured airspeed above the calibrated datum within the airspeed range of transitional flight. The instrument includes a sensing probe having a pair of fixed plane surfaces normal to a common vertical plane and adjustably mounted in a region of induced, stable, incident airflow under the wing or other part of an aircraft to sense differential impact pressure on the fixed plane surfaces, and an instrument to measure and display the sensed differential pressure. The instrument datum is calibrated by adjusting the slope of the sensing probe to the onset of mushing sink at flared touchdown (POWL=0) so that the instrument can reproducibly display the margin of airspeed above POWL ZERO to enable a pilot to avoid mush/stall induced inadvertencies, and to knowledgeably control transitional flight.

10 Claims, 7 Drawing Figures

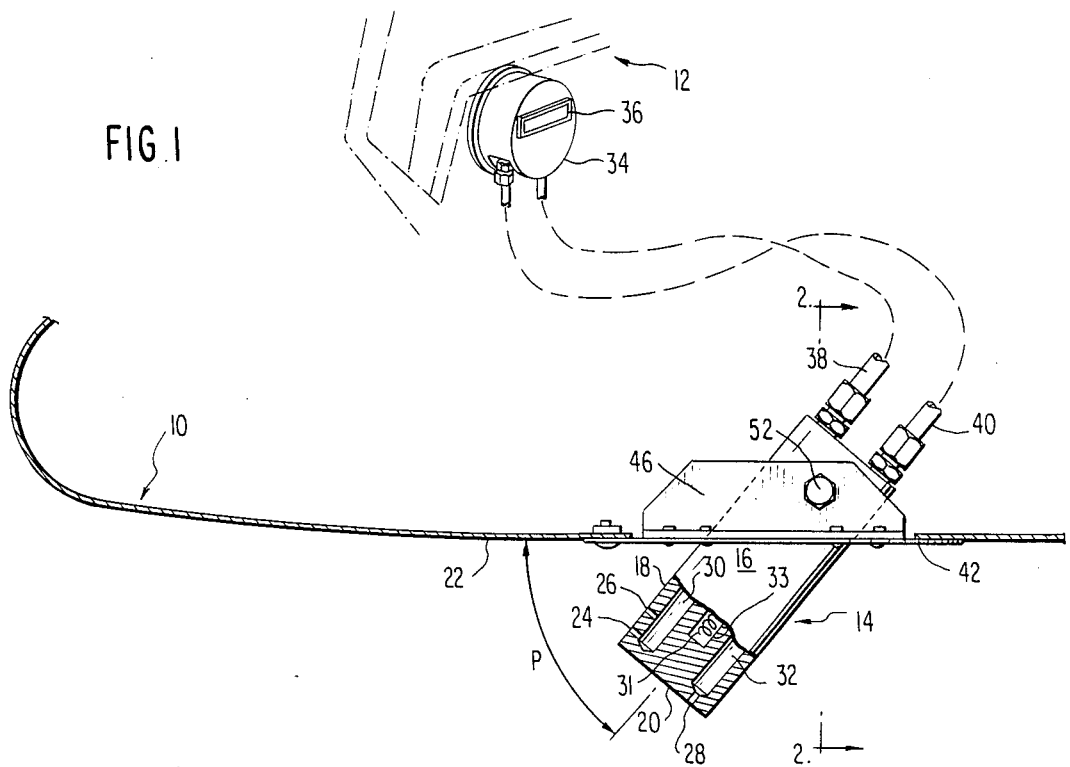
FIG.1
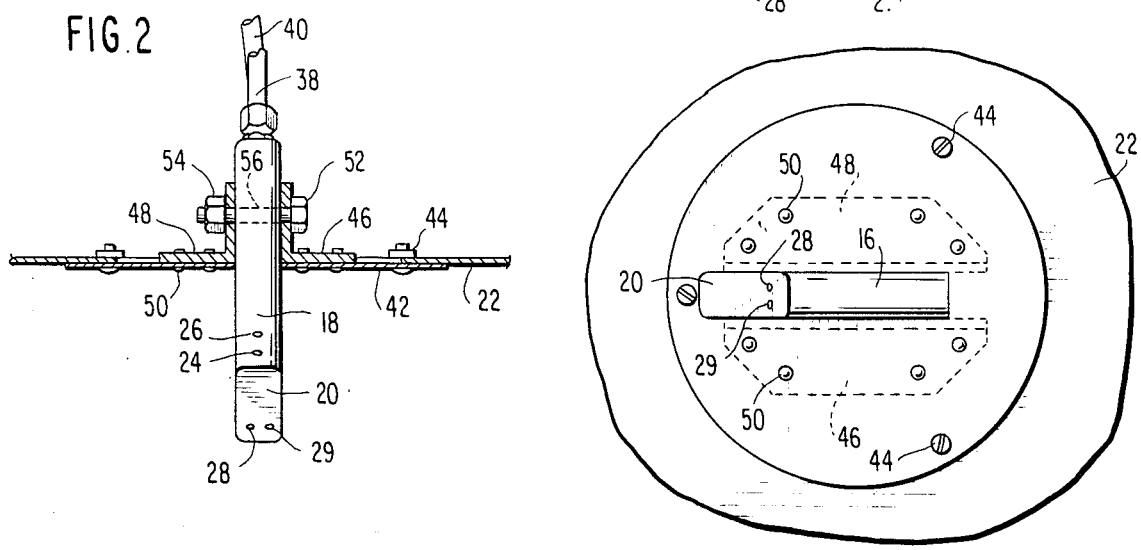
FIG.2
FIG.3
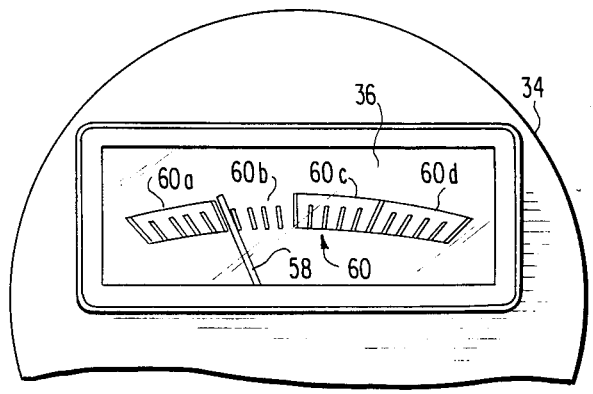
FIG.4

AIRCRAFT POTENTIAL OF WING LIFT INSTRUMENT AND METHOD

BACKGROUND OF THE INVENTION

1. Field of the Invention

This invention for sensing the wind's direction and velocity by directly measuring changes in the static boundary layer pressures of surfaces affected by the relative wind—has numerous aerodynamic applications to the practical science of aircraft flight.

In addition to its anemometric functions, this principle of boundary layer pressure measurement provides the incomparably accurate and reliable means of instrumenting aircraft for precision flight control at low airspeed.

Among the instrumentation which derives from this boundary layer principle are these several measurements:
  (a) Calibrated airspeed;
  (b) Change of induced angle of attack;
  (c) Calibrated potential of the force of wing lift (POWL)
  (d) Calibrated propeller thrust;
  (e) Calibrated engine power output;
  (f) The balance of aerodynamic forces at any point on the airframe surface.

This invention relates to a new instrument and method for the precision management of the potential of lift of an aircraft wing and particularly relates to a new instrument and method for coincidentally measuring changes in the velocity and angle of incidence of the impinging wind as the mathematical product of functions of these two variables and for transmitting this product in the energy form of differential pressure.

2. Prior Art

The history of heavier-than-air-flight spans three-quarters of a century and many sophisticated and useful instruments have been developed for the control of cruising and of higher speed flight. However, instruments for controlling flight in the low speed range regimes of becoming airborne, climbing, descending and landing have not been improved significantly from the earliest beginning. Control of transitional flight remains primitive and uncertain because both angle of attach and airspeed vary widely with changes in wing loading, center of gravity and flap deployment.

Usually, the private pilot depends solely upon the airspeed indicator and upon the physical senses and sensations. The pilot is said to fly "by the seat of the pants". Larger and more powerful aircraft often have the highly uncertain use of some form of angle-of-attack indication. The U.S. Navy's flight arm depends heavily upon angle of attack indication for the control of transitional flight.

Neither airspeed nor angle of attack indication reliably identifies the critical conditions of wing lift. Neither is useful in mathematically identifying the critical, incremental loss of dynamic lift which causes the differential onset of mushing sink. Neither can mathematically identify the maximum angle of climb, which is the "Vx" defined by the Federal Aviation Administration.

Today's accident statistics illuminate the need for flight instrumentation by which transitional flight can be controlled knowledgeably and intelligently: Of the four thousand non-scheduled, non-military aircraft accidents annually reported to the National Transportation Safety Board, relatively few occur which are unrelated to transitional flight and which do not involve uncontrolled collision with the ground (or water). Year after year, some four hundred General Aviation pilots and one hundred peacetime Naval aviators are killed in this same type of loss-of-control-at-low-altitude accident. Since the 1945 ending of World War II, more than ten thousand General Aviation pilots have died in the typical mush/stall/spin accident for want of specific transitional flight instrumentation.

Numerous "wind shear" disasters have been suffered by scheduled air carriers and by other aircraft in prematurely striking the ground on approach to landing and shortly after liftoff. Probably no such accident would occur that is attributable to wind shear if aircraft were adequately instrumented to sensitively display changes in the velocity and the direction of the relative wind. Unfortunately, in the known prior art, there is no instrument capable of detecting and warning of wind shear until too late for effective corrective action.

SUMMARY OF THE INVENTION

This invention allows the pilot to see and avoid inadvertent entrance into the region of reversed command, where all mush/stall accidents initiate. Continuously displayed is the calibrated margin of airspeed above the incremental loss of dynamic lift with the attendent mushing sink. Also displayed is the potential of wing lift in "G"s, by which the wing can be instantly loaded by elevator pressures alone. $\frac{1}{2}(DP/Dpo-1)=G$'s of POWL, which is a coined unit of force.

Wind shear accidents are avoided because this invention instantaneously compensates for the effects of wind shear as an inherent function of the system.

One application of the apparatus of this invention constitutes the only known aircraft instrumentation developed and designed specifically to measure and display the surplus of kinetic energy and the potential force of wing lift. This application of the invention discriminates between the potential of wing lift (force) and kinetic energy.

This invention is strictly an air pressure system. No electric circuitry is involved except for the conventional resistance heating of the airstream probe. The system is independent from all other aircraft systems. It continuously displays all critical transitional flight information except rate of turn, altitude and azimuth.

The apparatus of the invention is an instrument utilizing an airstream sensing probe with a pair of separately vented fixedly related plane surfaces which are normal to a common vertical plane. These vented plane surfaces are mounted under the wing so that they are impacted by induced stable streamline flow and provide two different air pressures the difference of which is detected and displayed in a glareshield-mounted display instrument. The airstream sensing probe is adjustably secured to an inspection hole cover so that its slope may be adjusted relative to the surface of the aircraft wing for calibrating the datum of POWL Zero.

The method of this invention utilizes the measurement of differential pressure in regions of induced stable airflow and the datum of POWL Zero is calibrated at flared touchdown which is reproducible irrespective of changes in wing load, flap deployment and center of gravity effects, inter alia.

DRAWING

In the accompanying drawings:

FIG. 1: Is a combination perspective and schematic view with a portion of a probe shown in section to best illustrate the mechanical features of this invention.

FIG. 2: Is a sectional view taken along line 2—2 of FIG. 1, except that the probe is not shown in section.

FIG. 3: Is a bottom plan view of the probe mounting shown in FIGS. 1 and 2.

FIG. 4: Is a detail elevational view of the instrument shown in FIG. 1.

FIG. 5: Is an outline view of the probe and support for illustrating the fundamental mathematical expressions of this invention.

FIG. 6: Is a graph of a family of curves constructed by plotting airspeed in knots per hour against differential pressure for correct adjustment of the probe.

FIG. 7: Is a schematic cross-sectional representation of an aerodynamic shape such as an aircraft wing, indicating the localized effect of flight.

DETAILED DESCRIPTION OF THE PREFERRED EMBODIMENT

Figure 5:
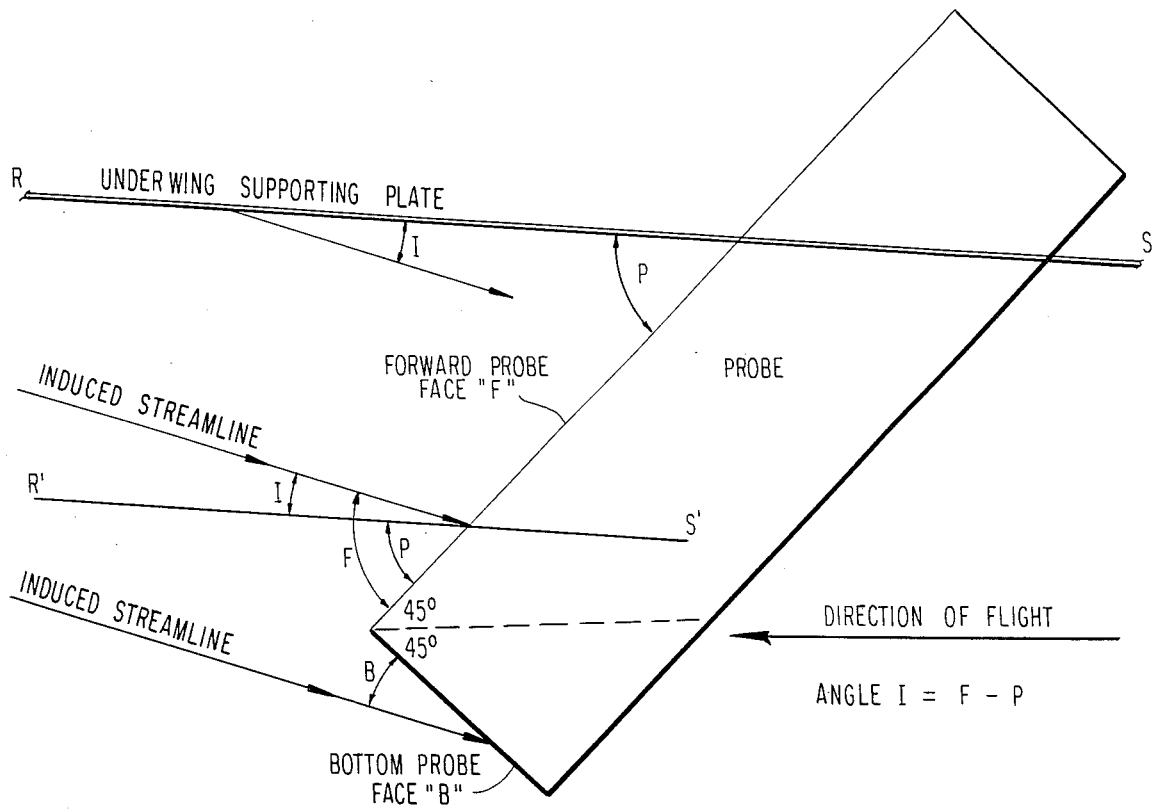

As shown in FIG. 1 a fixed wing aircraft of a conventional type has wings, such as wing 10 and a pilot compartment 12. An airstream sensing probe 14 includes a solid body 16 with a pair of fixed plane surfaces 18 and 20 in fixed relationship to each other, and perpendicular to a common vertical plane.

Probe 14 is mounted to the underside 22 of wing 20, in the region of induced, stable, incident laminar air flow beneath the wing. In a practical embodiment this would be in the front 15 to 30% of the wing chord.

A differential pressure gauge 34 of a commercially available type has a read-out means, such as a dial indicator 36 for viewing from the pilot compartment 12. In one practical embodiment such differential pressure gauge is one available commercially from Dyer Instruments Inc., of Michigan City, Ind., e.g., as in U.S. Pat. No. 3,645,140. The gauge 34 measures the differential of pressure applied to low and high side connections in the bottom thereof, as shown in FIG. 1. These connections are connected to tubular conduits 38 and 40.

The probe surfaces 18 and 20 each have vent holes therein exposed to the stable incident laminar airstream, venting the surface impact pressure. Surface 18 has two or more holes 24 and 26 and surface 20 has one or more holes 28 and 29. These holes provide fluid communication through passages 30 and 32 in the body 16 of probe 14 so as to transmit the average impact pressures at those holes to the differential pressure instrument 34. Thus, the difference of pressure instrument measures the difference of pressure between the plane surfaces 18 and 20 which are in fixed relationship to each other. Hole 26 is positioned sufficiently above vent hole 24 so that vent hole 24 may function as a drain for any liquid which may be entrapped in passage 30. The probe 14 may be machined from a block of aluminum suitable for aircraft use. A resistance heater 31 may optionally be mounted in a central hole 33 in probe 14 to keep any water in or on the instrument from freezing and distorting the plane surfaces 18 and 29 and plugging the passages.

The sensing probe 14 is mounted for angular adjustment on the underside 22 of wing 10 so that the angle between the bottom surface of the wing and the axis of the probe, indicated as in FIG. 1 may be varied. The angular adjustment mounting means includes a typical inspection plate 42 for the underside of the wing which is fixed to an access hole in the wing by mounting means such as fasteners 44. Secured to this inspection plate are brackets 46 and 48 by suitable fasteners 50. Extending into a space between the bracket and a hole in inspection plate 42 is the probe 14. Angular adjustment is provided by virtue of a bolt 52 and nut 54, the bolt extending through brackets 46 and 48 and through a hole 56 in the probe 14, see FIG. 2. For use on jets, the probe may be mounted on guides (not shown) for retractability.

The instrument 34 is preferably provided with a graduated dial for indicator hand 58. The dial 60 may be divided into sections 60a, 60b, 60c, and 60d, and these sections are preferably colored coded for ease in reading. Section 60a would be coded red, indicating danger, 60b is colored white, 60c is colored yellow, and 60d is colored green. The three-inch diameter instrument may be sunk approximately half its diameter into the glareshield decking in the pilot's compartment.

The probe 14 is mounted on a typical aircraft inspection plate 42, the inspection plate installed and the probe is initially adjusted so that angle P is approximately 50°. The instrument 34 is mounted in the pilot's compartment and connected to the probe through conduits 38 and 40. The instrument is then calibrated to datum at flared touchdown where the potential force of wing lift (POWL) is 0. In the embodiment shown this is where the indicator hand 58 is shown in FIG. 4. This calibration may be reaffirmed at each take-off and each touchdown, and POWL=0, the unit of force, is identical for all wing loading, for all flap settings, for any let-down power, and for any flyable center of gravity, although both angle of attack and air speed may vary widely.

In connection with explaining the mathematical basis for the invention, reference may be had to FIG. 5 which shows the probe 14 mounted at angle P, which is about 50° to the supporting plate under 22. The incident streamline of dynamic pressure, i.e., the direction of the induced stable incident and laminar airflow under the wing is indicated by line S. The front surface of the probe having vents 24 and 26 is surface F and the bottom surface of the probe having vents 28 and 29 is surface B. The angle between surface F and the induced streamline is angle F and the angle between the induced streamline flow and surface B is angle B. The highest dynamic pressure sense will be on surface F and therefore HP (high pressure)=q (sin F). Similarly the dynamic pressure on surface B will be LP (low pressure)=q (sin B). Of course, differential pressure DP=HP−LP. Therefore, DP=q (sin F−sin B). This is the fundamental mathematical expression of this application of the invention.

The potential of wing lift, POWL, is mathematically expressed in "G's" (the acceleration of gravity) by dividing the instant differential pressure (DP) by the datum differential pressure (DPo);

$$\frac{1}{2} \frac{g (\sin F - \sin B)}{go (\sin Fo - \sin Bo)} - 1 = POWL \text{ (Force) (in G's)}.$$

$$\text{Therefore } \frac{1}{2} \frac{DP}{DPo} - 1 = POWL \text{ in G's}$$

The vented boundary layer of pressure, vented to a pressure sensitive instrument, will vary as the trigonometric sine of the angle formed between the plane surface and the impinging streamline. That is, should the plane surface be oriented at 30° to the incident streamline the vented static boundary layer pressure will register exactly ½ of the full q or dynamic pressure because the sine of 30° is 0.500.

Figure 6:
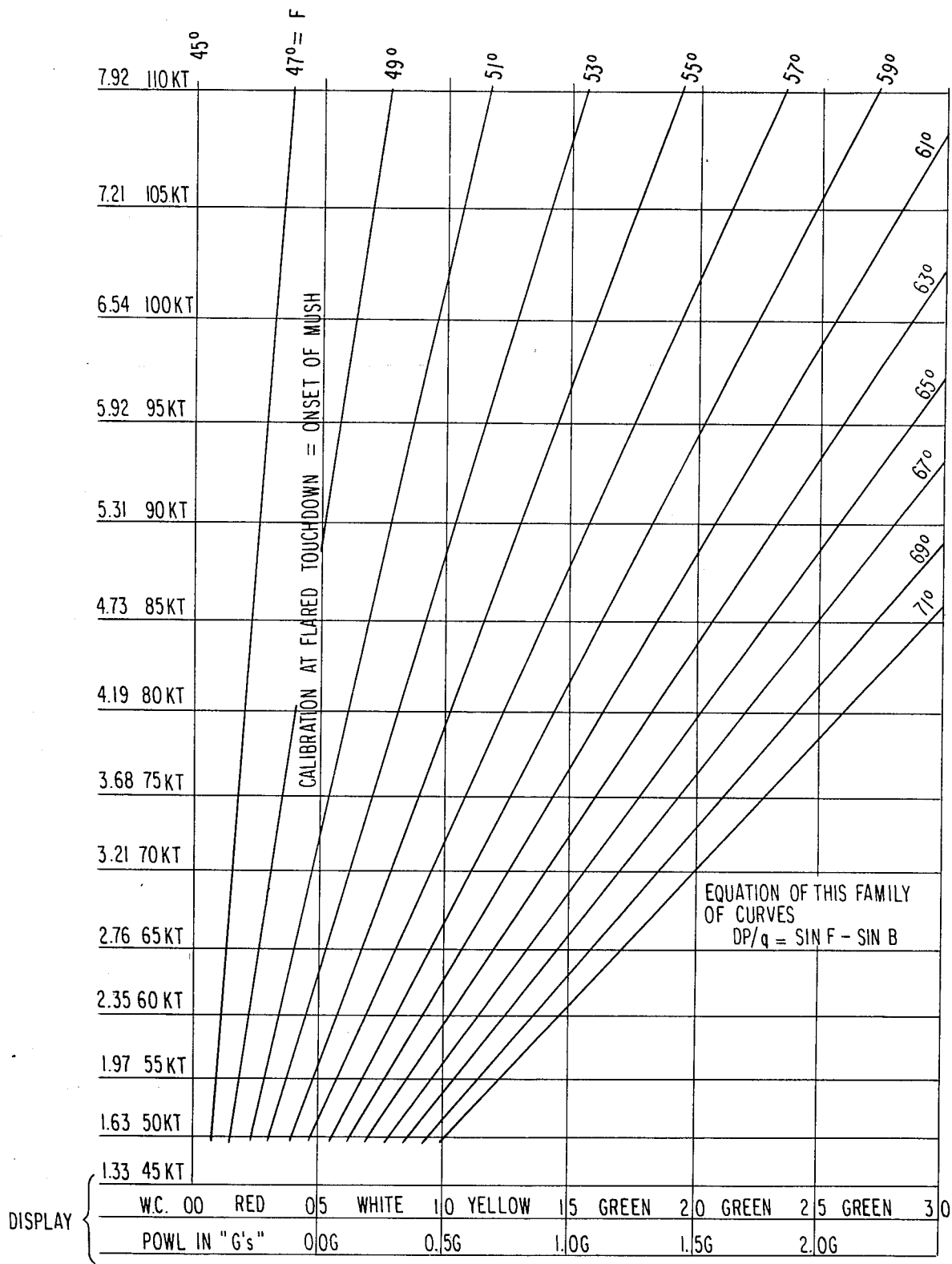

Although both the angle of incidence, i.e., the angle of the incident streamline to the underwing mounting, and the velocity of the wind can be sensed and measured using a single vented plane surface by comparing the sensed impact pressure with ambient pressure, this invention employs two vented plane surfaces which form a precisely known dihedral even though the two plane surfaces could be remote. Employing two vented plane surfaces and comparing the impact pressure sensed by each has the effect of amplifying and improving the sensitivity and accuracy of the system. Each of the vented plane surfaces, surface F and surface B, is impacted by equal dynamic pressure but at different incident angles. The function of the incident angle of the streamlines is: DP/q=sin F−sin B. Examining FIG. 6, note that the abscissa of the Cartesian coordinates is scaled in units of POWL in Gs while the ordinate is scaled in air speed in knots per hour for different angles F.

In flying several different makes and models of aircraft fitted with this invention, I have found that the reading of differential pressure is constant for each particular aircraft at the instant of flared touchdown, irrespective of all changes in wing loading, flap deployment and center of gravity. Here, POWL (Force) is zero.

The conclusion which I draw here is that the reading of DP indexes a specific potential of wing lift (POWL) in excess of the force of the single "G" necessary for steady flight. POWL (Force) is best expressed in "G's" (the acceleration of gravity). The potential of wing lift is defined as the number of "G's" with which the wing can be instantly loaded by elevator pressure alone, by virtue of the surplus kinetic energy available. At POWL-ZERO, the potential of wing lift (Force) is zero and the surplus kinetic energy also is zero.

To facilitate pilot interpretation of the differential pressure reading, and for the convenience of transitional flight control, the potential of wing lift is displayed in G's. The calibrated margin of airspeed above the datum of POWL-ZERO is also displayed. Thus, transitional flight is controlled by the displayed margin of airspeed ABOVE the onset of mushing sink—which is POWL-ZERO.

With this application of the invention transitional flight may be managed by displaying the potential of wing lift above datum. This would eliminate the unwitting cause of the recurring tragedies of classic inadvertencies such as stall/spin, stall/mush, runway undershoot and overshoot. It also provides a continuous warning against flying near the critical air speed limit which exists at the onset of mushing sink and provides speed control for routinely executed precision spot landings on short fields because it displays the calibrated margin of air speed above the critical onset of mushing sink.

For this application of the invention, installation of the instrument, no airframe modification other than the exchange of one underwing inspection plate is required. The airstream probe protrudes only 2 to 4 inches. The system is wholly independent from existing aircraft systems and no electrical circuitry is involved unless one desires to provide resistance heating.

As mentioned above, calibration is accomplished by initially setting the axis of the instrument at about 50° to the plane of the inspection plate, i.e., P=50°. The display needle 58 points to the right hand edge of the red sector at the instant of flared touchdown. If it doesn't, the airstream probe can be adjusted very slightly so that it does.

Aircraft calibration of the invention requires only that the display needle coincide with the white/red juncture at the instant of flared touchdown, which is the point where dynamic lift becomes differentially insufficient to prevent mushing sink. Using the dial shown DPo is 0.50 inches water column.

In the process of adjusting cockpit display at flared touchdown, the instrument needle is moved to the right approximately one division when the airstream probe is rotated one degree to the rear (steepened). Conversely, the display needle is moved one division to the left when the probe is rotated one degree forward (flattened).

The calibration of datum at flared touchdown is reaffirmed to the pilot at each liftoff and at each subsequent touchdown.

By way of further explanation, when POWL=0 is set at 0.50″ with the indicator hand 58, as shown in FIG. 4, then the indicator hand is between the white and yellow sections of the dial, i.e., in the center of the dial, the potential lift is exactly 0.5 G above the force of one G required for steady flight. In the 60c yellow sector the indicator hand indicates appropriate condition for approach and departure turns. In the green sector to the right of the dial in the 60d sector, the indicator hand indicates the best rate of climb and the maximum range glide. The red sector 60a of the dial below datum indicates danger, and the left-hand portion of sector 60a indicates an approach to full stall. The red sector 60a also indicates danger region, i.e., the region of "reversed command" where all mush/stall induced pilot inadvertencies are initiated. With this instrument operating and with the data indicator in the red sector 60a a pilot is forewarned that the onset of mushing sink has been passed.

The use of the instrument will now be described. Within the regimes of transitional flight, this invention directs the airspeed to be flown by continuously displaying the calibrated margin of useful airspeed above the critical datum of POWL-ZERO.

NEEDLE RESPONSE:

At full throttle, the display needle can respond only to elevator pressure. At partial power, the needle responds immediately to elevator pressure. It responds much more slowly to change in power setting. In the power-off glide, needle response is immediate to elevator pressure.

TAKEOFF:

The aircraft is capable of liftoff when the needle has moved to the right of the white/red juncture.

CLIMBOUT:

Climbout is initially at full power. Consequently, the needle responds only to elevator pressure. Holding the needle exactly at the white/red juncture ensures maximum angle of climb. This is precisely the FAA-defined Vx.

When elevator pressure moves the needle into the red sector—which is the region of mushing sink and reversed command—the angle of climb will decrease by the amount of mushing sink. If up-elevator is increased, moving the needle further into the red sector, the rate of mushing sink will increase to the point that the angle of climb is zero and the rate of climb is also zero. Any further movement of the needle into the red sector will result in a net loss of altitude and ultimately induce stall/spin.

The best rate of climb at whatever power setting is obtained when the display needle is held in the green sector where the vertical speed indication is maximum for the particular power setting. The best rate of climb is the conventional Vy, which converges with Vx at the absolute ceiling of the aircraft.

TURNS:

At traffic pattern altitude all approach and departure turns should be made with the display needle within the yellow sector.

FINAL APPROACH:

This is initiated with the needle near the top of the white sector. Flare is begun with the needle in the center of the white sector and ended at flared touchdown with the needle exactly at the white/red juncture. The descent rate in feet per minute is very nearly numerically equal to the knots of airspeed consumed in arresting sink to level flight.

TWIN ENGINE AIRCRAFT:

Marginal at best, single engine performance on a twin must be preserved by promptly cleaning up, judiciously banking toward the operating engine, stopping the turn—and by maintaining the precisely correct potential of wing lift for the maneuver required. In respect to twin engine aircraft, the Huntington Airspeed Director can truly become a 'life- saver'.

Installation of the airstream probe involves little more than the exchange of the probe-mounted inspection plate for the original plate.

Of course, the two air pressure tubes and the electric cord that is capable of conducting some 100-200 watts for resistance heating of the airstream probe must first be threaded through the wing structure and cockpit wall to reach behind the instrument panel and be securely tied and lagged to prevent chafing.

The position of the airstream probe has a rather narrow tolerance along the chord, (FIG. 7) lying between fifteen and thirty percent of the chord, measuring from the vertical projection from the wing's leading edge to the center of the inspection hole. Span-wise, the probe should be placed at least four feet outside the propeller arc for this application.

For optical considerations—and because the last segment of final approach is always visual—the HAD instrument display should be mounted on the glareshield, preferably about forty inches from the pilot's eye. For illumination, a small, shielded post light can be judiciously mounted close in front of the display To accomodate the lower part of the instrument, a cutout is made in the glareshield deck, 1¾ inches by 3¼ inches, matching the cutout of the instrument bracket.

To afford convenience in connecting the instrument before it is secured to the bolted bracket, the air pressure tubes should be brought up through the glareshield cutout with at least twelve inches of slack.

When the probe and the instrument have been correctly connected, the foreward edge of the airstream probe is lead to the right hand instrument tap marked "HI".

The airstream probe is inclined from its supporting inspection hole cover—approximately fifty degrees—toward the direction of flight being adjusted as necessary at calibration.

This unique instrument provides instantaneously the potential wing lift, i.e., the available dynamic lifting force of the wing is an empirical index independent of variables. Because the reference datum is calibrated at the point where the ratio of vertical force is exactly unity, several identities can be mathematically equated.

The calibrated datum is the empirical differential pressure;

(1) where the vertical forces are precariously balanced.

(2) where the potential of wing lift is zero (POWL ZERO).

(3) where the surplus kinetic energy is zero, and flare from the glide is impossible.

(4) which mathematically identifies FAA's Vx and the maximum angle of climb.

(5) which must be flown to maximize endurance with the fuel on board.

(6) for minimum power at zero sink in steady flight.

(7) at the onset of mushing sink.

(8) at the threshold of the inherently dangerous region of reversed command.

(9) at the threshold of the "back side of the power curve".

(10) which, for the first time in the history of aviation, mathematically identifies the precise onset of mush.

Although an optical viewing of the POWL is described in the preferred embodiment, the instrument could optionally provide alternative audible indications and/or automatic control for the aircraft as a result of POWL measurements. Moreover, the instrument could be mounted to receive the propellor thrust and provide an indication of the same to enable a pilot to ascertain the amount of runway required for this particular aircraft condition and density altitude.

In an endeavor to further explain the theory behind this invention (although not limited thereto) the following is submitted.

The impact pressure of the wind, impinging against a stationary surface, varies as the square of the wind's velocity and as one-half the change in air density.

The force (impact pressure) of a 100-knot wind blowing perpendicularly (at 90°) against a plane surface—at sea level and at 59° F.—is 34 pounds per square foot. If this plane surface is vented by holes drilled at any direction, and if the venting holes are connected to one side of a water manometer—the other side of which is open to the ambient air, the water column difference is 6.54 inches.

When this plane surface is inclined at 45° to the direction of the 100-knot wind, the force per unit area is reduced to 24 pounds per square foot—and the manometer reading (differential pressure) is 4.61 inches of water column.

Again, if the plane surface is inclined at 30° to the 100-knot wind, the unit pressure drops to one-half or, 17 pounds per square foot and the differential pressure reads 3.27 inches of water column.

Evidently, therefore, the pressure of the static boundary layer of air at the vented surface varies as the trigonometric sine of the angle of inclination to the impinging wind.

CASE A: If the angular direction of the impinging wind is known, the manometer reading (differential pressure) divided by the sine of the incident angle is "q", the dynamic pressure of the relative wind. Thus the induced calibrated air speed, $1CAS = 2$ (Sin F−sin B) or 2 $(C_F - C_B)$.

CASE B: If the impact pressure if the impinging wind, "q", is known, the manometer reading of differential pressure divided by "q" is the numerical value of the trigonometric sine of the wind's incident angle. Thus the induced angle of incident wind, IAOI=q−q sin A.

CASE C: If neither the velocity nor the direction of the impinge is known: To be useful, the manometer reading (differential pressure) must be calibrated at some reproducible condition—such as the unit lifting force (one "G") of an aircraft wing, which is the condition at the instant of flared touchdown. In this case, multiples of the potential of wing lift (POWL) are directly read from the differential pressure. Such is the invention described in detail above.

THE USE OF THE SECOND VENTED PLANE SURFACE:

In practice, the reference use of ambient air pressure is not invariably reproducible. For this reason, a second vented plane surface, in measured angular relationship to the first vented plane surface—is subjected to the identical "q", but at a different incident angle, which decreases as the other increases—and vice versa.

Primarily, the addition of the second vented plane surface provides a stable pressure reference for the manometer. Secondly, because its boundary layer pressure varies inversely with that of the first vented plane surface, amplification and increased sensitivity result.

The mathematical expression of CASE C with the added, angularly displaces surface is: DP=qSin F−qSin B or, DP=8(Sin F−Sin b) and—the potential of wing lift (POWL) is $\frac{1}{8}$(DP/DP$_o$).—In "G's".

Figure 7:
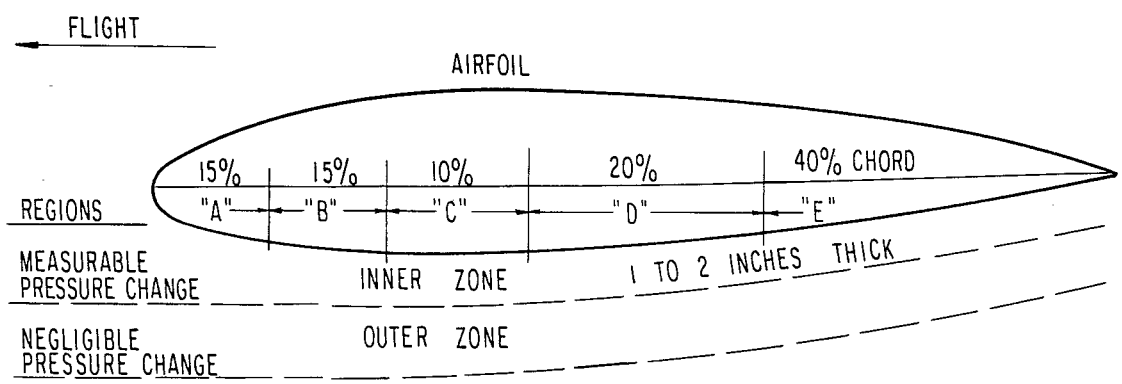

With reference to FIG. 7 the following chart explains it applicability to this invention.

THE 'OUTER' AERODYNAMIC ZONE IS DEFINED HERE AS BEING AT LEAST TWO INCHES BELOW THE BOTTOM OF AN AERODYNAMIC SURFACE.

REGION OF THE OUTER AERODYNAMIC ZONE AND ITS LOCATION:

| REGION "A" | REGION "B" | REGION "C" | REGION "D" | REGION "E" |
|---|---|---|---|---|
| FRONT 15% OF CHORD | 15% TO 30% OF CHORD | 30% TO 40% OF CHORD | 40% TO 60% OF CHORD | 60% TO 100% OF CHORD |

CONDITION OF THE REGION:

| UNSTABLE REGION "A" IS AFFECTED BY UPWASH AND BY TURBULENCE | STABLE THE MOLECULES ARE ACCELERATED AWAY FROM THE AERODYNAMIC SURFACE AND THEIR RELATIVE PATH IS A REPRODUCIBLE FUNCTION OF FOWL (THE POTENTIAL OF WING LIFT) | TRANSITIONAL MOLECULES ARE ACCELERATED TOWARD THE AERODYNAMIC SURFACE | STABLE THE RELATIVE PATH OF MOLECULES REPRODUCIBLY CONFORMS TO THE CONTOUR OF THE AERODYNAMIC SURFACE | TURBULENT |

UTILIZATION OF THE REGION:

(1) TO MEASURE CHANGE IN THE POTENTIAL OF WING LIFT FROM THE CALIBRATED DATUM AT THE INCREMENTAL ONSET OF MUSH. ONE AIRSTREAM PROBE, HAVING TWO VENTILATED PLANE SURFACES IS POSITIONED IN REGION "B" IN ORDER TO MEASURE CHANGES IN FOWL.
(2) TO MEASURE CHANGE IN ANGLE OF ATTACK FROM THE CALIBRATED DATUM. TWO AIRSTREAM PROBES ARE REQUIRED, EACH WITH A SINGLE VENTILATED PLANE SURFACE. ONE PROBE IS POSITIONED IN REGION "B" AND THE REFERENCE PROBE IS POSITIONED IN REGION "D".

(1) TO MEASURE THE CHANGE IN AIRSPEED FROM THE CALIBRATED DATUM. ONE AIRSTREAM PROBE HAVING TWO VENTILATED PLANE SURFACES IS POSITIONED IN REGION "D".
(2) TO MEASURE THE CHANGE IN PROPELLER THRUST FROM THE CALIBRATED DATUM. ONE AIRSTREAM PROBE HAVING TWO VENTILATED PLANE SURFACES IS POSITIONED IN REGION "D" WITHIN THE PROPELLER SLIPSTREAM.

I claim:

1. Potential of wing lift indicator instrument for aircraft of the type having fixed wings and a pilot compartment, comprising:
   (a) an airstream sensing probe means including a pair of fixed vented plane surfaces,
   (b) means fixing the vented plane surfaces to provide a fixed dihedral angle measured exteriorly from one surface to the other of greater than $\frac{1}{2}°$ relative to each other,
   (c) means mounting the sensing probe means from the aircraft to protrude into a region of induced, incident, stable air flow, so that both plane surfaces are subjected to dynamic pressure of the induced, incident, stable air flow,
   (d) means defining vent means in each of the pair of fixed vented plane surfaces,
   (e) a differential pressure measuring means including readout means positioned for viewing from the pilot compartment,
   (f) fluid communication paths for placing the vent means and the differential pressure measuring means in fluid communication for measuring the differential of the dynamic pressure on the fixed plane surfaces of the sensing probe means.

2. An instrument for aircraft as defined in claim 1 wherein the means for mounting the sensing probe means includes means for angularly adjustably positioning the probe means relative to a surface of the aircraft.

3. An instrument for aircraft as defined in claim 2 wherein the means for mounting the sensing probe includes further a plate removably attached to the underside of an aircraft wing, and a lockable, pivotable mounting for the sensing probe means carried by the plate.

4. An instrument for aircraft as defined in claim 1 wherein there are at least two vent holes in the uppermost of the fixed plane surfaces, the lowermost of the two vent holes also functioning as a drain hole.

5. An instrument for aircraft as in claim 1 wherein the differential pressure measuring means includes readout means and is a differential pressure gauge with a graduated dial.

6. An instrument for aircraft as defined in claim 5 wherein the graduated dial is calibrated and color coded to provide a visual indication of the potential of wing lift of the aircraft.

7. An instrument for aircraft as defined in claim 1 further comprising electrical heating means for heating the probe means.

8. A method of indicating the potential of wing lift for fixed wing aircraft of different weight, wing configuration, loading, flap position, and airspeed, the method comprising:
   (a) positioning a pair of vented plane surfaces in fixed justaposition, the dihedral angle measured exteriorly from one surface to the other of the plane surfaces being greater than 180°,
   (b) measuring differential pressure in a region of induced, stable incident airflow adjacent a surface of the aircraft from vent means in each of two fixedly related plane surfaces,
   (c) calibrating a datum of the measured differential pressures at flared touchdown of the aircraft in which the potential of wing lift is zero so that the measured differential pressure is an indication of the potential of wing lift,
   (d) displaying the potential of wing lift for readout by a pilot of the aircraft.

9. A method of indicating the potential of winglift for fixed wing aircraft as in claim 8, further comprising adjusting the angle of the fixedly related plane surfaces relative to the aircraft wing surface to accomplish calibration of the datum.

10. A method of indicating the potential of winglift for fixed wing aircraft as in claim 9, wherein the angle is approximately 50°.

* * * * *